(12) United States Patent
Moon

(10) Patent No.: US 7,053,964 B2
(45) Date of Patent: May 30, 2006

(54) CHANNEL SWITCHING APPARATUS OF DIGITAL TELEVISION AND METHOD THEREOF

(75) Inventor: Kang-Yun Moon, Seoul (KR)

(73) Assignee: LG Electronics Inc., Seoul (KR)

( * ) Notice: Subject to any disclaimer, the term of this patent is extended or adjusted under 35 U.S.C. 154(b) by 157 days.

(21) Appl. No.: 09/754,355

(22) Filed: Jan. 5, 2001

(65) Prior Publication Data

US 2001/0007482 A1    Jul. 12, 2001

(30) Foreign Application Priority Data

Jan. 7, 2000    (KR) .................................. 2000/630

(51) Int. Cl.
   *H04N 5/50*    (2006.01)
(52) U.S. Cl. ..................... 348/731; 348/553; 348/563; 725/32
(58) Field of Classification Search ............... 348/731, 348/569, 734, 553, 563; 725/38, 39, 48, 725/32

See application file for complete search history.

(56) References Cited

U.S. PATENT DOCUMENTS

| | | | | |
|---|---|---|---|---|
| 4,760,391 A | * | 7/1988 | Gries ........................ | 345/467 |
| 5,311,317 A | * | 5/1994 | Ogura et al. ................ | 348/725 |
| 5,430,493 A | * | 7/1995 | Kim ............................ | 348/564 |
| 5,786,845 A | * | 7/1998 | Tsuria ......................... | 725/32 |
| 5,900,916 A | * | 5/1999 | Pauley ........................ | 725/59 |
| 5,907,321 A | * | 5/1999 | Grossman et al. ............ | 725/32 |
| 6,075,515 A | * | 6/2000 | Keyson ....................... | 345/156 |
| 6,249,320 B1 | * | 6/2001 | Schneidewend et al. .... | 348/569 |
| 6,300,981 B1 | * | 10/2001 | Kim et al. ................... | 348/563 |
| 6,367,078 B1 | * | 4/2002 | Lasky ......................... | 725/52 |
| 6,460,181 B1 | * | 10/2002 | Donnelly ..................... | 725/50 |
| 6,492,997 B1 | * | 12/2002 | Gerba et al. ................. | 345/721 |
| 6,493,876 B1 | * | 12/2002 | DeFreese et al. ........... | 725/100 |

OTHER PUBLICATIONS

Definition of "logo"; American Heritage Dictionary of the English Language, 3rd Edition; 1992; Houghton Miflin Compan.*

* cited by examiner

*Primary Examiner*—Victor Kostak
(74) *Attorney, Agent, or Firm*—Birch, Stewart, Kolasch & Birch, LLP

(57) ABSTRACT

The present invention relates to a channel switching apparatus of a digital television and a method thereof. The present invention comprises a signal processing unit for receiving a broadcast signal, performing a digital signal processing, and outputting it, a CPU for searching a pertinent icon by accessing a storing unit storing a channel -icon corresponding to a channel of the digital broadcast signal outputted from the signal processing unit, an icon display unit for displaying the channel icon searched from the CPU on a screen, and the storing unit for storing each designated channel icon corresponding to each received broadcast channel. Accordingly, the present invention is capable of making identification of a channel easier when a user searches a channel of a digital television up/down by displaying a set channel icon through an OSD for the time required in order to display a broadcast signal corresponding to a select channel by using preset channel icons about each channel of the digital television.

2 Claims, 2 Drawing Sheets

100 ms of coding time is more required besides the
CHANNEL SWITCHING APPARATUS OF DIGITAL TELEVISION AND METHOD THEREOF

BACKGROUND OF THE INVENTION

1. Field of the Invention

The present invention relates to a channel switching apparatus of a digital television and a method thereof, and in particular to a channel switching apparatus of a digital television and a method thereof which are capable of making identification of a channel easier by providing OSD information related to a channel to be switched to a user when the user switches the channel of the digital television up/down.

2. Description of the Prior Art

According to a start of a digital broadcasting, a plurality of forms of a reception apparatus for a digital television such as a direct view DTV receiving the digital broadcasting, a DTV set-top box etc. are developed, and are sold.

In general, in order to select a pertinent channel among a plurality of broadcast signals received to the digital television, PAT/PMT information or PSIP information is required, in order to display the select channel on a screen. The received digital broadcast signal is switched into a digital channel and is displayed on the screen. A good amount of time is required in order to display the digital broadcast signal on the screen.

An estimated required time for the display after the digital switching will now be described as below.

First, about 300–400 ms time is required for tuning and channel demodulation of a received digital broadcast signal.

In order to select a channel of the digital television, about 400–500 ms time for searching a PID (Packet ID) comprised in the digital broadcast signal with each mode is required.

There are two modes for the digital television. A PAT/PMT mode requires about 400 ms time in order to search the PID, and a PSIP mode requires about 500 ms time in order to search the PID.

For outputting the received digital broadcast signal as a perfect picture after transmitting it to a video decoder, maximum 728 ms are required because of 500 ms time for receiving an I picture and VBV delay.

After switching the digital broadcast signal into a digital channel, 100 ms of coding time is more required besides the maximum 728 ms for displaying a perfect picture.

In the PAT/PMT mode, the total required time for displaying a picture can be described as below Equation 1.

[Equation 1]

400 ms+500 ms+500 ms+730 ms+100 ms=2230 ms

In the PSIP mode, the total required time for displaying a picture can be described as below Equation 2.

[Equation 2]

400 ms+400 ms+500 ms+730 ms+100 ms=2130 ms

In order to display the channel selected among the broadcast signals received by the digital television, about 2230 ms time is required in the PAT/PMT mode, and about 2130 ms time is required in the PSIP mode.

As described above, in the digital television, about 2 or 3 seconds are required in order to display the select channel on a screen. But this may cause unpleasantness and discomfort to a user by requiring some to select a request channel because each channel can display a received picture after displaying a black picture for 2 or 3 seconds. The above-mentioned problem is decreased according to the development of a hardware technology. However, instant channel switching is not improved, and accordingly it still causes discomfort to the user.

In addition, in order to select the pertinent channel among the digital broadcast signals in the digital television, the PAT information, PMT information and PSIP information are required.

SUMMARY OF THE INVENTION

An object of the present invention is to provide a channel switching apparatus of a digital television and a method thereof which are capable of making an identification of a select channel easier by displaying a preset channel icon through an OSD before displaying the select channel on a screen in channel up/down of the digital television.

Another object of the present invention is to provide a channel switching apparatus and method for a digital television, which overcome the limitations and disadvantages of the related art.

In order to achieve the above-mentioned and other objects, the channel switching apparatus of the digital television in accordance with an embodiment of the present invention comprises a signal processing unit for receiving a broadcast signal, performing a digital signal processing and outputting it, a CPU for searching a pertinent icon by accessing a storing unit storing channel icons corresponding to the channels of the digital broadcast signal outputted of the selected channel from the signal processing unit an icon display unit for displaying the channel icon searched from the CPU on a screen, and the storing unit for storing each designated channel icon corresponding to each received broadcast channel.

The channel switching method of the digital television in accordance with the present Invention comprises an inputting process for inputting an up/down key of a channel, a searching process for searching the channel selected by the up/down key of the channel, a searching process for searching a channel icon corresponding to the searched channel, and a displaying process for displaying the channel icon corresponding to the searched channel on the screen for the receiving the broadcast signal.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawings which are given by way of illustration only, and thus are not limitative of the present invention and wherein.

DETAILED DESCRIPTION OF THE PREFERRED EMBODIMENTS

A channel switching apparatus of a digital television and a method thereof in accordance with the present invention will now be described with reference to accompanying drawings.

Figure 1:
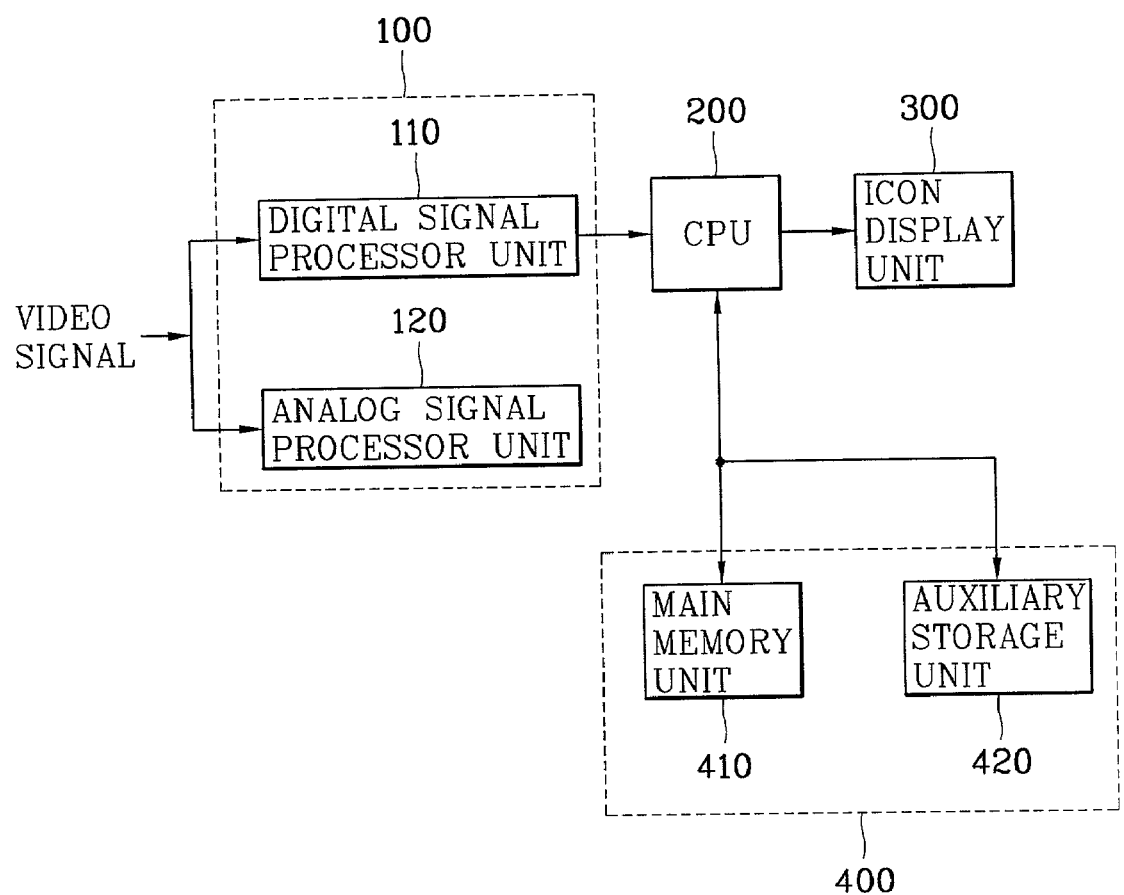
FIG. 1 is a construction profile illustrating a channel switching apparatus of a digital television in accordance with the present invention.

FIG. 1 is a construction profile illustrating a channel switching apparatus of a digital television in accordance with an embodiment of the present invention. It comprises a signal processing unit 100 for receiving a broadcast signal, performing a digital signal processing and outputting it, a CPU 200 for detecting a pertinent icon by accessing a storing unit 400 storing channel icons corresponding to the channels of the digital broadcast signal outputted from the signal processing unit 100, an icon display unit 300 for displaying the channel icon of the selected channel outputted from the CPU 200 on a screen, and the storing unit 400 for storing each designated channel icon corresponding to each received broadcast channel.

The signal processing unit 100 comprises a digital signal processor unit 110 for processing the received broadcast signal into a digital signal and outputting it, and an analog signal processor unit 120 for processing the received broadcast signal into an analog signal.

The storing unit 400 stores program data, and sets a diagram or a character representing a broadcasting station in each received broadcast signal as a channel icon corresponding to the channel. The storing unit 400 comprises a main memory unit 410 for storing in a lookup table format the channel icons of the channels, each icon being set by using a certain diagram or character in accordance with the received broadcast signal by the user and corresponding to a particular channel, and an auxiliary storage unit 420 for storing data for operating a program.

Figure 2:
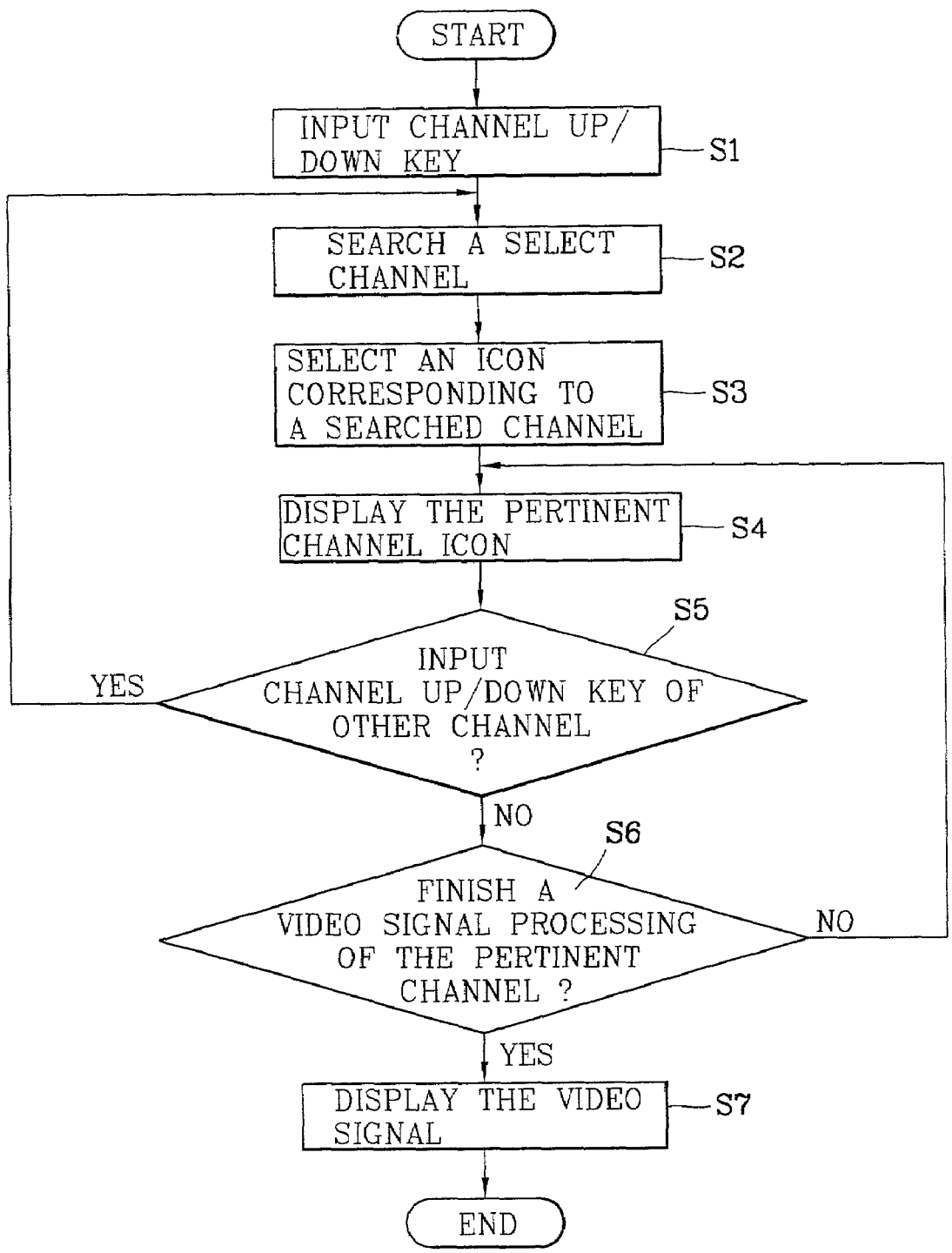
FIG. 2 is a flow chart illustrating a channel switching apparatus of a digital television in accordance with the present invention.

The operation of the apparatus will now be described in more detail with reference to accompanying FIG. 2.

First, when a power is applied, the CPU 200 receives program data of the whole system from the main memory unit 410, and judges whether the channel up/down key (or channel number key) of the digital television is inputted. The data for operating the program of the main memory unit 410 is inputted from the auxiliary storage unit 420.

When the channel up/down key is inputted (S1), the CPU 200 searches the pertinent channel (selected channel) (S2), receives a broadcast signal corresponding to the searched channel from the signal processing unit 100, and searches for an icon of the pertinent channel by comparing the pertinent channel information with channel numbers and icons stored in the main memory unit 410 (S3).

The channel icon corresponding to the pertinent channel obtained from the main memory unit 410 is then displayed on a screen after passing the icon display unit 300 (S4), and it is judged whether the channel up/down key (or channel number key) is inputted again (S5).

When the up/down key for selecting another channel is not inputted (S5), the CPU 200 judges whether processing of the video signal of the currently selected channel corresponding to the signal outputted from the digital signal processor unit 110 and analog signal processor unit 120 is finished (S6). When it is finished, the broadcast signal of the currently selected channel is displayed on the screen (S7), but when the processing of the video signal is not finished, the channel icon corresponding to the currently selected channel is displayed. If it is judged at S5 that the up/down key for another channel is inputted, the above-mentioned process is performed repeatedly.

Meanwhile, when an up/down key of a new channel is inputted before the video signal is finished, the CPU 200 searches the newly inputted channel (S2), receives a broadcast signal corresponding to the searched channel, searches a channel icon corresponding to the new channel (S3), displays it on the screen (S4). and judges whether another up/down channel selection is inputted (S5). And, the above-mentioned process is performed repeatedly.

The channel icon stored in the CPU 200 is data about the diagram and character representing each broadcast station in the received broadcast signal, and the user stores the received broadcast signal as a certain diagram and character in accordance with the broadcast station with the lookup table format.

The channel icon can be set so as to be matched directly with the broadcast station while the user searches the stored icon among the data related to the plurality of the icons stored in the CPU 200. When the broadcast station transmits the data related to the icon representing the broadcast station. the CPU 200 detects it and stores it in the main memory unit 410. Accordingly the channel icon can be used in channel switching.

In addition, when a viewer does not want to display the channel icon on the screen, it is possible to set so that the icon is not displayed by installing an additional select key.

As described above, the present invention is capable of displaying the set channel icon by the OSD before displaying the broadcast signal corresponding to the select channel in channel up/down of the digital television by the user by using the channel icon set in advance about each channel of the digital television. The present invention is capable of making the channel identification easier by displaying in advance the channel icon of a newly selected channel stored in the OSD during the time required to display the program of the newly selected channel on the screen. Accordingly the present invention can provide the maximum satisfaction to the user during channel switching.

What is claimed is:

1. A channel switching method to facilitate channel identification for a user of a digital television having a channel selection key signal, a video signal processing unit, a central processing unit, a main memory unit, an auxiliary storage memory unit and an icon display unit to facilitate channel identification, the method comprising:
   first, inputting from the auxiliary memory unit, data for operating a program of the main memory unit, when a channel is selected;
   second, searching for the selected channel and receiving a broadcast signal corresponding to the searched channel from the signal processing unit;
   third, selecting a pertinent channel icon for the selected channel by comparing an icon corresponding with the channel with an icon of the channel stored in the main memory unit;
   fourth, displaying the pertinent channel icon;
   fifth, determining whether another channel is selected;
   sixth, determining whether processing of a video signal corresponding to a signal outputted from the video signal processor is finished, if another channel is not selected;
   seventh, displaying the broadcast signal of the selected channel, if the video signal processing is finished;
   eighth, displaying the pertinent channel icon of the searched channel, if the video signal processing is not finished;
   ninth, repeatedly performing the previous steps, if another channel selection is not made;

tenth, searching a newly selected channel if a new channel selection is made before the video signal processing is finished; and eleventh, repeating the sixth, seventh, eighth and ninth steps with respect to the newly selected channel to facilitate identification of a selected channel.

2. A channel switching apparatus to facilitate channel identification for a user of a digital television having a channel selection key signal, a video signal processing unit, a central processing unit, a main memory unit, an auxiliary storage memory unit and an icon display unit to facilitate channel identification, the apparatus comprising:

means for inputting from the auxiliary memory unit, data for operating a program of the main memory unit, when a channel is selected;

means for searching for the selected channel and receiving a broadcast signal corresponding to the searched channel from the signal processing unit;

means for selecting a pertinent channel icon for the selected channel by comparing an icon corresponding with the channel with an icon of the channel stored in the main memory unit;

means for displaying the pertinent channel icon;

means for determining whether another channel is selected;

means for determining whether processing of a video signal corresponding to a signal outputted from the video signal processor is finished, if another channel is not selected;

means for displaying the broadcast signal of the selected channel, if the video signal processing is finished;

means for displaying the pertinent channel icon of the searched channel, if the video signal processing is not finished;

means for repeatedly performing the previous steps, if another channel selection is not made;

means for searching a newly selected channel if a new channel selection is made before the video signal processing is finished; and means for repeating the first four of the last five recited steps with respect to the newly selected channel to facilitate identification of a selected channel.

* * * * *